(12) United States Patent
Pomponio

(10) Patent No.: US 8,631,393 B2
(45) Date of Patent: Jan. 14, 2014

(54) CUSTOM DATABASE SYSTEM AND METHOD OF BUILDING AND OPERATING THE SAME

(75) Inventor: Mark Pomponio, Orlando, FL (US)

(73) Assignee: Vision Genesis, Inc., Orlando, FL (US)

( * ) Notice: Subject to any disclaimer, the term of this patent is extended or adjusted under 35 U.S.C. 154(b) by 708 days.

(21) Appl. No.: 12/559,020

(22) Filed: Sep. 14, 2009

(65) Prior Publication Data

US 2010/0070954 A1  Mar. 18, 2010

Related U.S. Application Data

(63) Continuation-in-part of application No. 11/782,736, filed on Jul. 25, 2007, now abandoned, and a continuation-in-part of application No. 11/080,072, filed on Mar. 15, 2005, now abandoned.

(60) Provisional application No. 60/820,416, filed on Jul. 26, 2006, provisional application No. 60/605,352, filed on Aug. 27, 2004, provisional application No. 60/553,131, filed on Mar. 16, 2004.

(51) Int. Cl.
*G06F 9/45* (2006.01)
*G06F 9/44* (2006.01)

(52) U.S. Cl.
USPC ............ 717/145; 717/120; 717/140; 717/148

(58) Field of Classification Search
None
See application file for complete search history.

(56) References Cited

U.S. PATENT DOCUMENTS

| | | | |
|---|---|---|---|
| 6,704,926 B1 * | 3/2004 | Blandy et al. ................ | 717/148 |
| 6,760,905 B1 | 7/2004 | Hostetter et al. | |
| 7,065,756 B2 * | 6/2006 | Barsness et al. ............. | 717/148 |
| 7,234,132 B2 * | 6/2007 | Lam .............................. | 717/120 |
| 7,290,252 B2 * | 10/2007 | Diedrich et al. ............ | 717/145 |
| 7,350,200 B2 * | 3/2008 | Lueh et al. ................... | 717/148 |
| 7,913,236 B2 * | 3/2011 | Adl-tabatabai et al. ...... | 717/140 |
| 7,954,094 B2 * | 5/2011 | Cascaval et al. ............. | 717/145 |
| 2002/0095654 A1 * | 7/2002 | Fukase et al. ................ | 717/106 |
| 2002/0116702 A1 * | 8/2002 | Aptus et al. .................. | 717/170 |
| 2003/0135842 A1 | 7/2003 | Frey et al. | |
| 2004/0025148 A1 | 2/2004 | Krueger | |
| 2004/0194057 A1 * | 9/2004 | Schulte et al. ............... | 717/114 |
| 2004/0205320 A1 * | 10/2004 | Haugen et al. ............... | 711/210 |

(Continued)

OTHER PUBLICATIONS

Ogata et al., Replay compilation: improving debuggability of a just-in-time compiler, Oct. 2006, 11 pages.*

(Continued)

*Primary Examiner* — Thuy Dao
(74) *Attorney, Agent, or Firm* — Blue Filament Law PLLC; Avery N. Goldstein; Marc S. Balban

(57) ABSTRACT

A process for performing a software task is detailed that includes preparing readable programming computer code and storing the computer code within the storage of a computer system in uncompiled form. The computer code is compiled to machine code in response to an executional call for the code. The machine code corresponding to the computer code is then executed to perform the software task. In addition to removing the conventional limitation of retaining only executable compiled software, only a portion of a larger total computer code necessary to perform the desired software task is compiled in response to an executional call from a user, request for another computer process, a prompt by an interfaced electronic instrument or a boot event.

19 Claims, 3 Drawing Sheets

(56) References Cited

U.S. PATENT DOCUMENTS

| | | | |
|---|---|---|---|
| 2004/0205736 A1* | 10/2004 | Mitsumori et al. | 717/142 |
| 2005/0071826 A1* | 3/2005 | Nistler et al. | 717/145 |
| 2005/0086635 A1 | 4/2005 | Parikh et al. | |
| 2006/0048114 A1* | 3/2006 | Schmidt | 717/148 |
| 2007/0240135 A1* | 10/2007 | Stoodley et al. | 717/140 |
| 2008/0098374 A1* | 4/2008 | Adl-tabatabai et al. | 717/145 |

OTHER PUBLICATIONS

Huang et al., Fast and efficient partial code reordering: taking advantage of dynamic recompilatior, Jun. 2006, 9 pages.*

Tikir et al., Recompilation for debugging support in a JIT-compiler, Jan. 2003, 8 pages.*

* cited by examiner

CUSTOM DATABASE SYSTEM AND METHOD OF BUILDING AND OPERATING THE SAME

CROSS REFERENCE TO RELATED APPLICATION

This application is a continuation-in-part of U.S. patent application Ser. No. 11/782,736 filed Jul. 25, 2007 and also claims priority of U.S. Provisional Patent Application Ser. No. 60/820,416 filed Jul. 26, 2006, and also is a continuation-in-part of U.S. Utility application Ser. No. 11/080,072 filed on Mar. 15, 2005, which in turn claims priority of Provisional Patent Application Ser. No. 60/553,131 filed Mar. 16, 2004 and Provisional Application Ser. No. 60/605,352 filed Aug. 27, 2004 which are incorporated herein by reference.

BACKGROUND OF THE INVENTION

1. Field of the Invention

The invention relates to database systems, and more particularly, to a customizable database system communicating between transactional and processing database units retaining code in uncompiled form to increase efficiency.

2. Description of the Related Art

Databases are widely used by organizations to manage copious amounts of information accumulated in the course of operations. Large amounts of information dictate the use of large, specialized, and often very complex database applications.

In general, additional software installation creates upheaval within an organization. In the process of new software installation, tasks that should be automated are not accounted for by the generic software resulting in tasks that should be automated being relegated to inefficient manual processing. The costs of incorporating automated processes for those not covered by generic software, that if in place would profoundly enhance organizational efficiencies, are often prohibitive and therefore retained as manual tasks. As a result, the installation of software intended to enhance efficiency institutionalizes inefficiencies associated with tasks not contemplated when the software was written.

In order to develop a product that can be deployed across a variety of organizations that vary widely in organizational structure, personnel numbers, personnel expertise, creativity requirements, goals and even physical office layout, currently one must select a software option from among the vendor options available. The option selected is either superior to, or representative of, a population of vendor options available.

Unfortunately, too many specific processes of a particular organization are unaddressed due to the cost associated with developing software to address those specific processes. The time associated with a programmer learning an organization-specific process and developing a custom application to address that process sacrifices true strategic potential to address manual processes because the cost benefit analysis of custom software is unfavorable. The current requirement to hire an individual for the sole purpose of supporting a software package intended to impart efficiency on an organization contravenes that goal. Unfortunately, it is usually the case that the breakthrough efficiencies possible are rarely achieved due to the inordinate number of problems that arise when a generic software package is force fit into a specific process of an organization.

It is a central premise of market economies that software products must possess consistent, identical architecture in order to control production and delivery costs. Although unintentional, this requirement inevitably limits efficiency improvement. The market process itself has created a barrier preventing software developers from creating error-free software. The high failure rates of current software are due to the unavoidable fact that software processes have an operational sequence that is fixed. Since process sequences are composed of individual, distinct events with precise start and stop points, each reliant in succession upon the execution of previous steps, the successful execution of software as a whole results. Where the conventional process breaks down is when one or more predefined sequential events receives no input or an invalid input. With the immense complexity of organizational software applications, all designed to avoid duplicate input from data sources, an input error can and often does create an error ripple effect that progresses geometrically throughout the software process. The complexity associated with organizational software applications means that a programmer debugging or designing a work around for a problem uncovered after implementation rarely fixes the problem completely. Rather, since software processing sequences are interrelated and do not execute continuously, a problem considered resolved invariably will reappear when a dependent but rarely used process is invoked by the software process system.

The causes of no input or invalid input for a particular field are numerous and unique to the organization implementing the software process. Since software applications are tied to other systems, the software application typically receives input from users, receives data uploads, and performs mathematical functions to generate data fields. Regardless of the source of inputs, it is a logical conclusion that if the input for any reason whatsoever is unacceptable by the application software at any point in the software process, then the software process as a whole is compromised.

As a result, organizations regularly have to modify processes and procedures to accommodate a particular database application, leading to incompatibility issues for subsequent queries. Further, such database applications require lengthy development and implementation times, which are disruptive to the day-to-day operations of the organizations.

Currently, code is written and compiled into libraries, classes, and executables, converting it to machine code that can be read by computers. Changes to code require the application to be recompiled. When the code is extensive, the complex referencing and use of common classes and libraries introduces significant risk of creating run errors that are difficult to isolate and correct. The storage of compiled code as a result represents a source of code malfunction while imposing a barrier to dynamic customization and construction of a software environment.

Changes to software application currently require significant time and carry a high risk for the reasons listed above. Commercial off-the-shelf ("COTS") software, because it is compiled as one major application, is not amenable to being customized, requiring customers to adapt their processes to the software, rather than having the software accommodate their processes. Nicholas Carr pointed out this fact in his landmark article "IT Doesn't Matter", stating boldly that since software forces similar processes on all customers, company strategic abilities are severely limited or even eliminated as a result. Building a system from the ground up is fraught with risk and has been estimated to fail roughly 60% of the time.

Accordingly, there exists a need to provide a process or method of providing a flexible software application structure that integrates with existing processes and procedures of an organization, allowing for dynamic communication between information technology processes and an end user. Dynamic software customization and storage in uncompiled form achieves efficiency goals of an organization.

SUMMARY OF THE INVENTION

A master application is installed on an organizational computer system to guide organizational personnel through the steps of constructing a customized database. Upon selecting a computer server and platform to host the database, organizational processes are divided into building blocks having well-defined input-output relationships. The application provides a list of organizational types and business processes in the form of modules that facilitate the construction of an organizational data flowchart that extends to all users of the system. Each user has a user identification that predetermines the ability of an end user to input data, receive reports and have other privileges associated therewith. An end user is provided with a graphical interface with the database, the graphical interface being customizable to a format chosen by the end user. The inventive application is not language specific but rather is scripted onto the underlying database with SQL program language to construct the entire database including constraints, triggers, procedures, indices and key fields.

A database system is thereby provided that includes a transactional database housed on a first computer server for receipt of data input. A processing database optionally also providing reporting is in communication with the transactional database for receipt of the data input from the transactional database and process data. A user computer interface transmits the data input to the transactional database.

A process for performing a software task is detailed that includes preparing readable programming computer code and storing the computer code within the storage of a computer system in uncompiled form. The computer code is compiled to machine code in response to an executional call for the code. The machine code corresponding to the computer code is then executed to perform the software task. In addition to removing the conventional limitation of retaining only executable compiled software, only a portion of a larger total computer code necessary to perform the desired software task is compiled in response to an executional call from a user, request for another computer process, a prompt by an interfaced electronic instrument or a boot event.

DETAILED DESCRIPTION OF THE PREFERRED EMBODIMENTS

Figure 1:
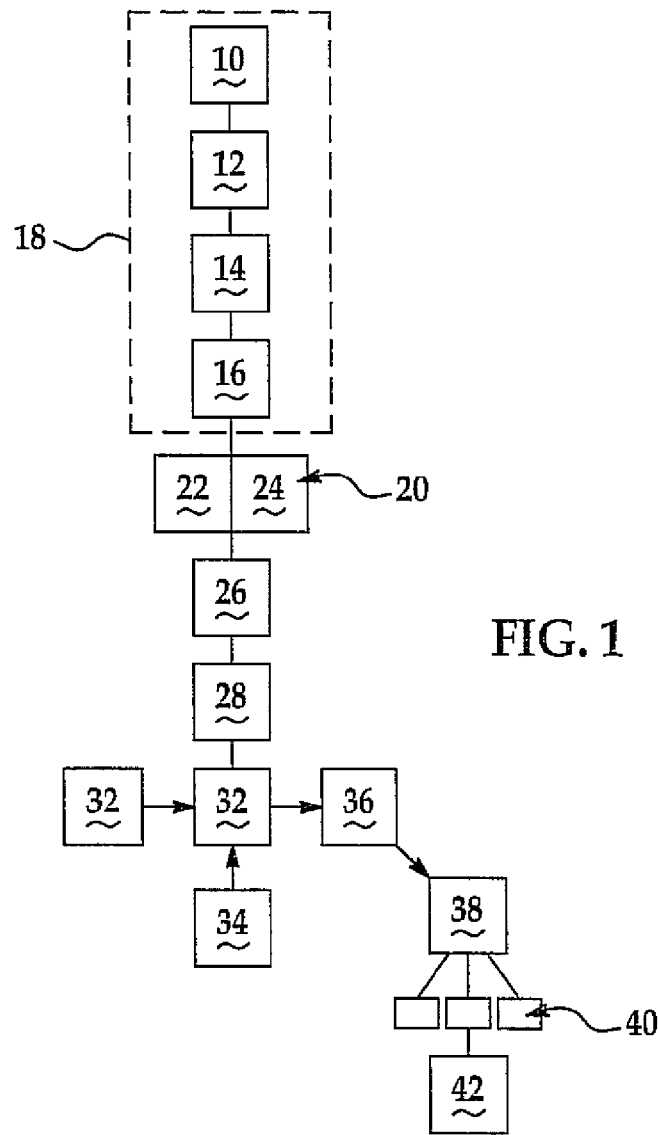
FIG. 1 is a schematic flowchart of an inventive database construction process.

The present invention has utility as an organizational database. The present invention is premised on software that does not use predefined processes; rather, dynamic sequencing is used to enable flawless execution. The inventive software architecture includes blocks of functions, or blocks of events or transactions related to the organization business. To ascertain the size and characteristics of each unique block, the broad range of organizational business processes are each dissected and segmented until the event remaining is free from probabilistic influence. Thus, the ideal block function is attained when the event block consistently produces the same result with the same input. While inputs themselves will vary, the input-to-result relationship consistently remains a one-to-one relationship.

In order to assemble blocks of functions, an interface is designed that contains the logic behind event sequencing in the organizational business process. This interface is presented so as to allow the user to build the process themselves based on their personal and organizational preferences. As a result, the interface preferably contains commands that are graphical and intuitive. A preferred graphical user interface includes icons representing all of the common parts associated with the software process. A user graphical interface contains representations of the software process with all forms and fields that have been built by the user, guided by the software program's organizational business logic. Connections are then made to other conventional software processes. Preferably, connections to other processes are only provided at points where data is exchanged. The movement of data between the inventive software and other processes is thereby simplified and not subject to variation.

In contrast to the prior art, the database application software corresponding to the present invention is a set of operational tools, each of which is logically sound, unchanging and therefore subsequently free from error. Owing to the dynamic form of the inventive software process, installation is greatly simplified. As a result of the inventive software architecture, maintenance agreements and user training are greatly diminished, if not entirely eliminated.

Behind the graphical user interface lays a data storage and processing framework. The fields in the database tables are dynamically determined according to user software process construction and dependent on input fields and processing constants. Table relationships and database integrity are ensured according to the present invention by controls built into the application.

Each data input screen provided to a system user is preferably connected to an independent transactional table. This transaction table contains all table attributes currently used. All transactional tables preferably reside in a separate transactional table database and more preferably on a separate transactional table database hard disk drive. A separate central database is preferably established containing the roll-up tables for each of the transactional tables. More preferably, the central database resides on a separate hard disk drive. The roll-up tables associated with the processing database are intended to contain all the standard relational database constraints and functions. The processing database is preferably the primary source for reporting to administrators, managers and users of the system. Preferably, data flows from the transactional tables constituting the transactional database to the processing and reporting database that in turn generates reports, handles queries and provides read-only data to the various levels of system users. In this way, many of the table validation processes are removed from the transactional database thereby enhancing overall system efficiency.

The invention provides a novel multiple database subunit database structure that allows use of data incorporated from a preexisting database and affords efficient transactions and processing/reporting by allocating these tasks to separate database subunits. An inventive method is also provided for forming the novel database structure. The novel database structure and inventive method are now described below.

A new database, synonymously described as a "target" database, is provided having a plurality of fields defining at least one table. The fields and tables are structured and formatted according to the type of data to be used and requirements of an end user of the data. It is appreciated that an inventive database structure is established de novo or is applied to operate simultaneous with or upgrade an existing conventional database.

In the instance where a preexisting, old database, synonymously described as a "legacy" database, is provided that has multiple fields defining at least one table, structural and format harmonization is often required. Accordingly, it is necessary to map the fields and tables of the old database structures onto the new, or vice versa. The fields and tables of the old database are then related or matched to correspond with the fields and tables of the new database. In mapping the fields, it is appreciated that several commercially available tools are operative herein. By way of example, these illustratively include the mapping functionality that is available in setting up a DTS data transformation task within Microsoft's SQL Server and Data Junction, which is dedicated to pure extract-transform-load (ETL) functionality. Data Junction is appreciated to provide comparatively greater functionality. There are many low-cost or no-cost tools commercially available on the web for ETL tasks encompassed by this mapping step. Where commercial tools are not available, tools may be built with existing developer resources commercially available and applied to complete the mapping. In addition there are a number of commercial tools available to perform ETL that accomplish similar functionality.

The format of the fields and tables of the new database is revised to match the format of the fields and tables of the old database. It should be appreciated that the new database can have fewer or greater fields and tables than the old database. Optionally, one need not use all of the fields and tables of the old database. Alternatively, the new database may have fields and tables into which only new data will be entered.

Data from the fields and tables of the old database are imported into corresponding fields and tables of the new database. The import of data can be done with any tool after the database is constructed or may be done simultaneously with the database construction. Once the fields have been mapped, the changing of the data types on the new database results in the source fields and new database fields either lined up side by side or alternatively having a visual connector such as a line linking the source and destination field for each map. For each pair of mapped fields, an option would appear or would make itself available for the user to have the opportunity to make the format type change to the new table via context menu, checkbox, modal dialog or some other form.

The interface that is generated is in a master-detail form. Since the transaction tables are the target of input, forms would be generated with the transaction fields in the detail area, and the parent table fields in the master area. Because the database schema contain the information on these relationships, the application would discern the information from the schema and automatically construct the forms. Should the relationships not be part of the schema, the information would have to be otherwise provided before the form processing could commence. A sample method for dynamic form creation is to use an IDE similar to that used by tools such as Vision Studio where database fields are dragged onto the form. Prior to dragging the field, or once it is dropped on the form, the control type is selected by either context menu or other method. As the fields are dragged onto the form, the table fields and associated controls are stored for creation of an in-memory dataset as part of the data access layer. As fields/controls are created or removed, the dataset is modified accordingly. When the form is saved, the data access code is created based on the information stored from the form creation. Modification to the form and data access code is modified as fields and controls are added or removed from the form and saved. This is not the only method available for flexible, dynamic and rapid form creation.

It would be possible to complete the steps outlined above beginning with form and connector construction and working backwards toward the database. Although this would require far more complex tools and be more prone to error, it would nonetheless accomplish all that the prior steps have in producing what is needed to work forward from this point.

The new database is placed on a suitable computer accessible storage medium, such as a server, workstation, or mainframe device.

Regardless of whether an inventive database is built upon an existing database or produced de novo, interfaces are provided to allow entry of data into appropriate fields and tables of the new database. Specifically, a user interface is coupled to the new database through which a user can enter data into fields and tables. The user interface optionally has the appearance of forms or existing interfaces from other applications or software; or any suitable technology allowing the end user to enter data into the new database, such as voice recognition. Additionally, a non-user interface is coupled to the new database through which data from an external database can be automatically entered into corresponding fields and tables of the new database. The non-user interface can be in the form of connections to other systems, files to be uploaded or other data transfer mechanisms not requiring active input from an end user.

The sequence of steps in establishing and operating an inventive software database structure is detailed with respect to FIG. 1. Initially, application software is installed on a customer computer system 10. The software installed is not merely a compiled and executable program associated with production software but rather a master application that guides a user organization in constructing unique organizational enterprise software. The inventive software application is a surrogate that incorporates the expertise and skills typically provided by programmers, accountants, business consultants, academics and the like that would typically be employed by an organization in constructing custom software processes. As part of the application software installation 10, the user organization installs the software on a dedicated computer server. At least one application administrator is chosen to begin construction of the inventive database structure. The administrator provides the application with information regarding user identifications and business operation specifics that relate to the particular practices of the organization.

As a preliminary matter, the administrator selects a server 12 to be the location on which the database application software will build the inventive database and related applications. It is appreciated that the administrator can designate multiple servers as the locations on which various database structure applications will reside depending on factors illustratively including organization size, organizational units, total database size and security concerns. Preferably, an administrator is provided with a list of available servers which are detected by the loaded application software through the use of conventional software controls and detection routines.

Upon an administrator choosing a server 12 designated to host the enterprise application, the administrator gathers and assigns user privileges. The general parameters of the enterprise application, such as modules to be constructed, user identities and other administrative details, are defined 14. While an administrator for an inventive software process has the usual rights and privileges, a functional manager status is also optionally assigned intermediate between the administrator and general users. The functional manager is assigned responsibility for a specific organizational process routine.

An administrator then constructs an organization and information-data type flowchart 16 to facilitate user and manager completion of the organizational data flowchart. To further facilitate administrator customization, a list of data types, synonymously referred to herein as database fields, are preferably provided in the software database application to accelerate setup. The list of data types include those commonly used by other organizations and by way of example might include accounting, human resource, inventory, and sales type fields. It is appreciated that an administrator can use one of the provided database field designations from the list, add a new data type to the list so as to customize data capture for the organization, or modify a provided data type from the list provided to better reflect the data capture preferences of the organization. Preferably, the administrator is provided not only with a list of data types, but also with a list of industry types provided with the application software. Typically, such a list of industry types is all inclusive and has limited overlap with other industry types in the same list. Substantial documentation is provided such that an administrator is clear as to which industry type is appropriate for a specific location. It is appreciated that while an organization as a whole may have a particular industry designation, a specific department or unit, whether geographically distinct from other units, typically only operates a subset of the overall organization database.

With administrator selection of organizational type, data type or customization of each 16, as well as the assignment of functional manager privilege 14, the beginnings of an organization-wide flowchart and the required modules to be constructed begin to emerge from the general parameters just entered. The application now enters a phase of dynamic computer-aided module design and construction as well as dynamic application building by functional managers and users. Collectively, these preliminary addressing steps are designated in FIG. 1 at 18.

Module construction 20 has a computer-aided design and construction component 22 and a user application building component 24. To initiate computer-aided module design construction 22, the administrator is provided with a list of predefined organization process modules. The administrator then selects all of the modules to be installed on the organizational computer system for a particular geographic location or organizational unit. Unlike a conventional software module, an inventive module represents one of a finite group of business processes that are provided as part of the application. The selection of any one module provides documentation as to the details of that module. Documentation provided in a detail represents a functional block with which the user organization will technically emulate current organizational practice either through coupling to additional modules or editing the module consistent with differences highlighted by the documentation relative to organizational practice. By way of an example, in an accounts payable environment, an administrator would designate that the modules to be installed should include accounts payable along with payroll, human resources, and accounts receivable. The selection and optional modification of a module 26 provided as part of the application in many instances will prove satisfactory for routine organizational operations.

A functional manager designated by the administrator assigns the right of users within the functional manager's reporting hierarchy such as those who will be able to perform data input 28. The application as installed will automatically detect the presence of an active directory on the network and utilize identities defined in step 14 relating to user identity, cost centers and the like. Should an active directory not be present, the application provides a utility to import the information or link from another computer system or application package in order to afford access to data regarding users specific to the organization. This attribute avoids needless administrator effort. In the context of an accounts payable example, the administrator is assigning responsibility for each of the areas identified by modules such that accounts payable is under the authority of John Doe.

The functional manager preferably uses a graphical interface, more preferably including icons provided by the application to begin constructing the remainder of the data flow diagram down to the level of individual users or data sources for data input 28. Typically, the functional manager designates the source for various entry points of data and maps these sources onto the computer-provided module. The functional manager also at this point would interact with the administrator to modify the application-provided module consistent with organizational existing practices. Returning again to the accounts payable example, John Doe as functional manger at this point would designate that all accounts payable invoices are to be channeled through Jane Doe while all accounts payable payments are to be processed through Kevin Doe.

With the administrator and functional managers using icons to provide the application with the remainder of the data flow diagram, designated individual users or data sources for data input are provided. There is ability to assign data input points to individual users such that each data field is assigned. The result is that the inventive database application software dynamically determines the source and entry point for all data input. As a result, the application is capable of tracking, categorizing and enabling lookup of all data input points. Other data sources such as other organizational computer systems are constructed automatically. Preferably, connections to other computer systems are constructed using conventional connectivity software with the inventive application, and the sequence of pulling data from other computer systems is automated.

The inventive application is optionally directed to connect to another data source to retrieve data input 30. In this instance, the application searches for the necessary information required for the connection and prompts the user for the necessary variables when the necessary information is not found. The application then retrieves the schema from the external data source and provides the fields to the user to select the data points being retrieved. Upon completion, the application will test the data connection and indicate to a user whether the data exists, is incomplete, or is in the wrong format. In the latter case, reformatting of the data is preferably performed automatically. Using schema retrieval, inputs points are paired with corresponding output points. Optionally, the timing of updates is also scheduled for each of the identified connections. Preferably, SQL is used to automatically correct database schema. Where available, known database definitions are optionally included in an inventive application particularly those for popular conventional software packages.

A function database input 32 now exists. Optionally, a user invokes the application interface to select an entry that will represent the data process under their control 34. Preferably, the interface is in the form of graphical icons. The process of user data sequencing is fully editable and preferably prompts the user and verifies entries to ensure enterprise application consistency and integrity. In this way, the end user constructs a customized interface with the enterprise application. The end user process dynamically applies predefined constraints and guidelines as provided for through defined identities of step 14 and the functional manager allocation of data entry authority according to step 28. Preferably, the inventive application leads a user through the construction of an individualized interface consistent with their personal preferences and existing competencies. Again returning to an accounts payable example, Kevin Doe provides the use of a standard "form" interface while Jane Doe has a spreadsheet she has used for years containing all of the required data. Jane Doe is more comfortable with spreadsheets and she browses the spreadsheet through the application. Then the application examines the file and prompts Jane Doe to identify which columns go with particular input fields.

The application uses native code applied by the administrator alone or in concert with a functional manager to enforce security on the file to prevent changes that would compromise overall database integrity. It is appreciated that an end user can select any method of input desired whether in the form of a form, a spreadsheet, or even a word processing application. The application thereby applies security rules imposed as detailed above and prompts the user to map input fields. User input regardless of format into a particular data field. It is appreciated that in addition to keystroke data entry, voice recognition, barcode scanner, and cellular telephone signals are also suitable forms of data input. In instances where an existing or as yet undeveloped technology is used to provide input to the inventive application system, the application system will permanently alter the input signal in order to ensure integrity and security of the database as a whole. The application system is provided with the ability to programmatically envelope a system file or resource in security that ensures data integrity as objects foreign to the application are integrated.

Upon completion of a module through to user data input authorization, the application optionally provides the administrator with an opportunity to select an efficiency model to monitor and identify inefficiencies. Conventional efficiency models illustratively include TQM and Six Sigma. It is appreciated that an efficiency model is also operative in the setup of the initial addressing steps and the selection of preloaded modules. Since processes are typically a series of decision trees containing alternative paths, as inputs specific to the organization are entered either at the addressing step level 18 or through functional manager mapping 28, the appropriate paths are chosen based on the efficiency model that has been selected. Preferably, when an administrator changes an efficiency model, the application will indicate before implementation of the change which module constructions 20 or organization information and/or data types 16 will need to be modified to effectuate the new efficiency model.

The dynamic aspects of the inventive application system are provided by the ability to piece together parts of an organizational business process through a graphical interface that contains all of the business logic. The graphical interface as noted previously is preferably a recognizable set of graphic icons that when dragged into an active work area temporarily becomes part of the application that is being constructed. In this way, the unique data requirements or individualized processes are readily developed. As a given process is constructed, the inventive application system validates everything completed by the user as it is entered. The validation process is performed on the business building block sequence to ensure that the events cannot occur out of sequence. Rules imparted by the administrator or functional manager will be part of the application system and define those sequences to which actual events and potential entries will be compared. Overall logical structure is also evaluated to ensure the absence of duplicates, dead-end processes or other defects that inhibit the efficient operation of the inventive application system. Additionally, database structure based on organization data elements is optimized to provide fast processing. Validation against known database rules and norms provides basic assurance that the overall database structure is comparable to best practices.

Upon the inventive application system acquiring a datum either through retrieval from another computer connection system 30 or through user entry 34, the datum is scripted in SQL programming language 36 onto a transactional database. With a datum in SQL script, the datum is in a format suitable for retention in the structure of a transactional database. In contrast to conventional database systems, dynamic scripting of information at the enterprise level of the database end is performed as part of a development process by the end user.

Upon all the information inputs being provided, specifically including end user mapping of sources of data input, the inventive application system scripts the database onto the platform and server designated by the administrator. According to the present invention, end user information and enterprise application general parameters are scripted in SQL programming language. The resulting database has the ability to change a selected database platform for a particular enterprise application, as well as dynamically create an enterprise application and/or determine a database platform. Preferably, the database portions in SQL include all constraints, triggers, procedures, indices and key fields. This has the effect that since SQL programming language is common to the database, similar enterprise applications can be written on any platform. In this way, an organization can leverage existing information technology investments and vastly improve the efficiency of integrating legacy systems.

Scripted database 36 generates reports 38. Potentially a report can be generated based on any fields present in the database. Preferably, reports are constructed by dragging the desired fields into a mock report. The fields are placed in the order they are to appear and optionally are arranged in a hierarchical manner. Preferably, the SQL for the query underlying the report is automatically scripted. Again referring to an accounts payable example, "payables aging" is constructed by putting the vendor name first, then the details of each invoice field therebelow. Upon generating a report 38, a list of users to receive the report is identified 40. User names are inserted, dragged or otherwise input into a list that accompanies each report that is constructed. It is appreciated that a report can be forwarded to users on a one-time basis or a calendar established to provide an interval or date on which to send the report via e-mail to each user identified. In the context of the accounts payable example, the payables aging report is sent to John Doe on every Friday and on the last day of each month.

The inventive application system in addition to scripting the database 36 also scripts the enterprise application in the coding language chosen and installed on the network location chosen including general identification and user parameters. This option facilitates changes in any and all portions of the inventive application system. Additionally, an inventive application optionally determines the database platform from a variety of possible options illustratively including Informix, DB2 and the like. Additionally, the inventive application system is able to determine the coding language for the enterprise application without additional administrator or user input. Termination of the coding language independent of manual input facilitates the ability to change the coding language for the enterprise application and repeat all or part of resulting database structure on other servers with respect to both transactional database information and enterprise application code. In the context of the accounts payable example, all the logic of processing accounts payable is contained in the inventive application system.

Managerial reviews for accuracy and administrative reviews for completeness are provided at step 42. Such reviews entail printing flowcharts of data entry completed by each user. In this way, end user and external computer system data inputs can be evaluated and the performance of the inventive application system determined. In the context of the accounts payable example, John Doe might print flowcharts completed by Jane Doe and Kevin Doe. Reviewing these flowcharts for completeness and accuracy provides job performance information. John Doe then submits flowcharts through the application to the administrator as being approved.

Figure 2:
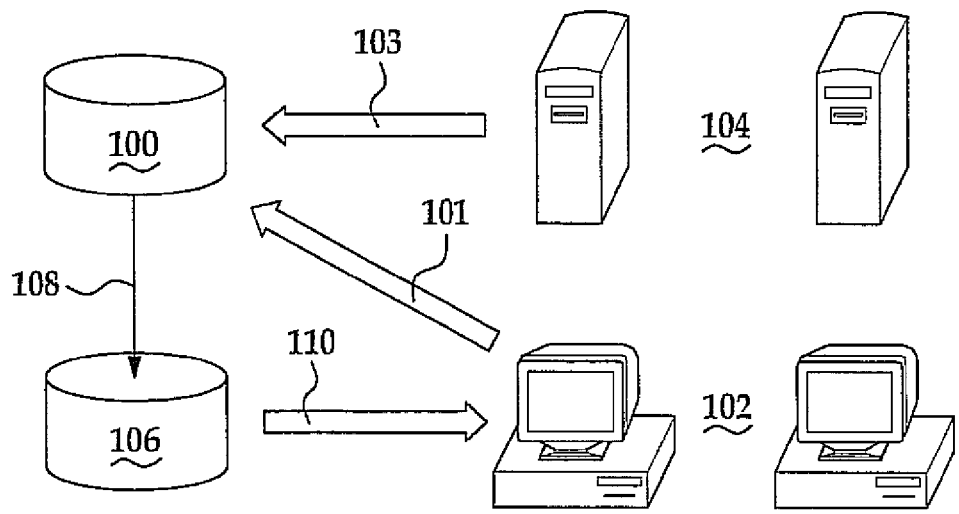
FIG. 2 is a schematic of an inventive database structure and data flow.

An application of the inventive database structure and data flow is illustrated in FIG. 2. A transactional database 100 functions as a repository for receiving data input 101 from the user 102 and data input 103 from non-user 104 interfaces such as other computer systems such as the servers depicted. There is at least one additional processing/reporting database 106. The processing/reporting database 106 includes the same field and table structure as the transactional database 100 and also includes additional fields and tables to receive and store processed information from the transactional database 100. Some or all of the data from the transactional database 100 is optionally processed 108 prior to entry into the processing/reporting database 106. Such processing intermediate between the databases 100 and 106 illustratively includes predetermined functions or algorithms, such as copy, sum or multiply. These functions optionally also include time tags or parameters that allow sequencing or execution of the functions at a specific time. Data in the processing/reporting database 106 is then made accessible 110 and readable via the user interface 102.

Figure 3:
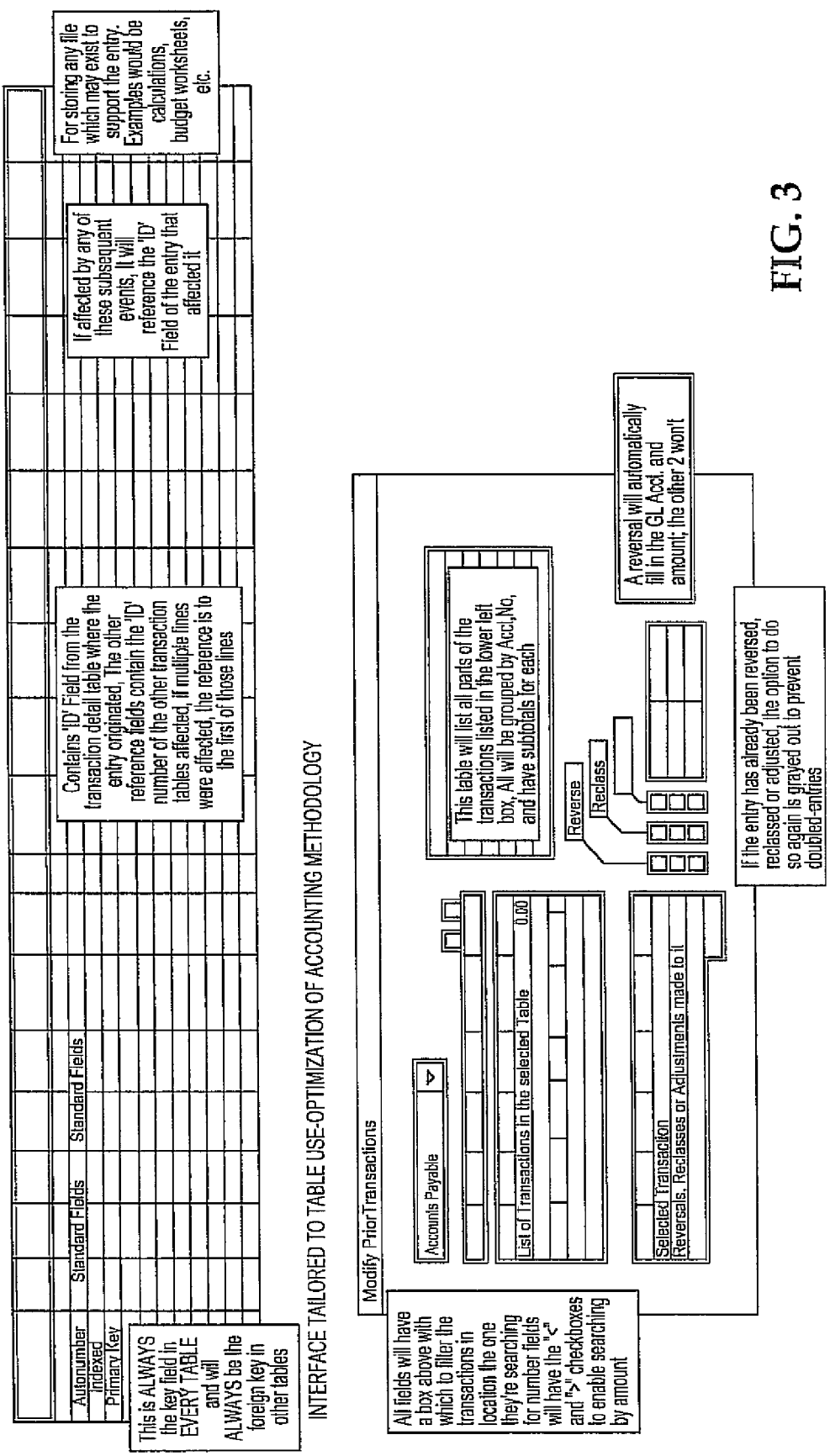
FIG. 3 is an exemplary format for a transactional database according to the present invention.

An exemplary format for the transactional database 100 is provided in annotated FIG. 3. It is appreciated that the format for the interface is readily tailored to a specific user. In FIG. 3, an interface is depicted for optimization of accounting methodology.

It should be appreciated that at any time before, during or after each step above, fields and tables can be added, deleted or modified according to the requirements of the end user. Further, creation and modification of the database structure can be accomplished using any suitable tool known by those having ordinary skill in the art. These illustratively include Visio (Microsoft), Rational Rose (IBM) or other Rational software design products, and DB Artisan (Embarcadero Software).

An inventive database system differs from existing systems in that only those data entry forms required for a particular transactional table are constructed. It is appreciated that a form is constructed from a default configuration provided with the application or modified by an end user to satisfy a personal preference. In the event that the form is personalized, a mapping protocol is invoked to designate the relationship between inputted data and the database transactional table that the data supports. As a result, an end user need not be trained to use a new system. Rather, the new system is configured to adapt to the existing end user work practices. The present invention captures efficiencies through limiting end user training time and programmer development of a vast array of application functions that the end user does not utilize.

Additionally, the present invention is distinct in establishing database operational rules and scripting those rules to the appropriate server after the database is in place. This is in marked contrast to conventional database protocols that require reconstruction of prewritten rules with incomplete modification of prewritten rules leading to system failures. Additionally, since source and destination fields are wholly editable, the source and destination will be readily constructed to each be a single field or multiple fields thereby allowing an organization to manipulate fields so as to optimize efficiency.

The proper execution steps according to the present invention are facilitated by changes in the method of code development, execution, storage and compilation. The present invention departs from the prior art in that the inventive application is not fully compiled, and instead is left in code form until required to execute. Typically compilation occurs based on a triggering event illustratively including a request by a user, a request by another computer process, a prompt by an interfaced electronic instrument, a boot event, or a combination thereof. Also in contrast to conventional practice, according to the present invention, only that portion of total code that is needed is compiled and executed thereby eliminating most of complex referencing run errors that plague conventional software. It is appreciated that in response to a given request, the entire application code is compiled and executed when called with the recognition that for large applications this complete compilation execution can constitute an overall inefficiency. The present invention, by leaving application code in readable, changeable form until actually required and only then compiling the code affords the ability to dynamically change the application code with little effort in avoidance of complete compilation to executable form before the application is again ready to operate. The compilation methods can be either real-time as the code is called or precompiled into smaller executables or classes based on criteria that can be dynamically predetermined, such as user access to functionality.

Figure 4:
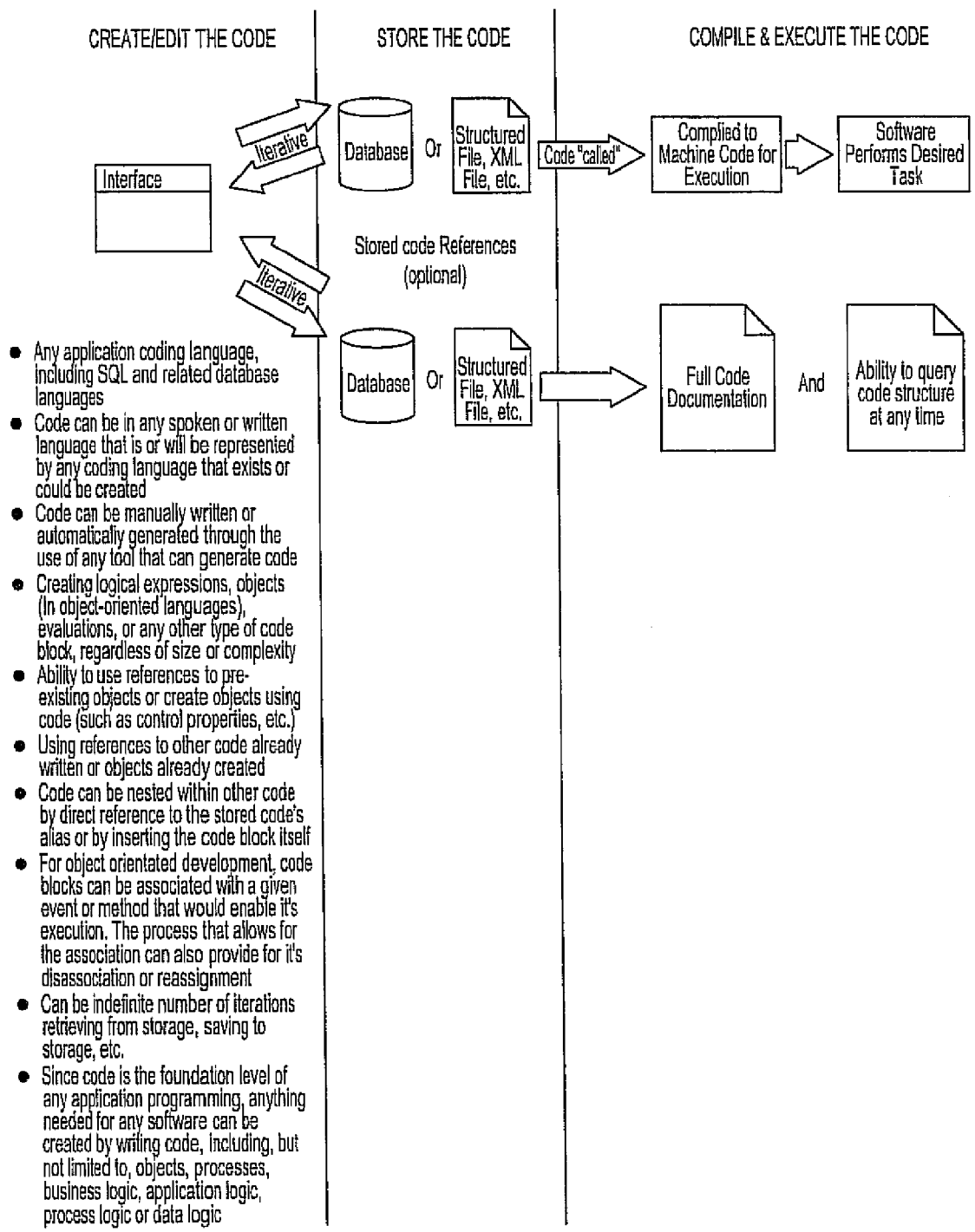
FIG. 4 is a schematic of creation and usage of dynamic coding using uncompiled code storage.

As illustrated with respect to FIG. 4, as application code is needed by a user, computer process, instrument or boot command, the needed code is called from storage, compiled, and executed. In a preferred embodiment, the code is stored, or at least indexed, in a referenceable structure. As a result, particular sections of code are rapidly located and called for compilation and subsequent execution. It is appreciated that storage of wholly uncompiled or partially compiled code in the database, structured storage file, library, Extensible Markup Languag (XML) file or the like affords addressable access to the needed code in an efficient manner. Alternatively, application code is separated into individual components, illustratively including text files, from which the code is retrieved, compiled, and executed. It is appreciated that a variety of methods and forms by which code in uncompiled form is stored and retrieved currently exist and are operative within the context of the present invention. The wholly uncompiled or partially compiled code is readily stored in a variety of formats including plain text or encrypted depending on the level of security deemed appropriate by the system manager. It is appreciated that various criteria and sequences of code storage and retrieval are applied. Optionally, a particular sequence of code is readily validated in a variety of points along the inventive process illustratively including before storage, upon being called, periodically, or a combination thereof. Additionally, it is appreciated that code can be retrieved from storage to be modified, associated with other sections of code, or otherwise changed at any time during development of the initial code or after deployment in an operational environment. It is appreciated that the inventive process is operative with code that is manually written or automatically generated. Currently a number of commercially available software tools can be used to generate code. Many of these tools operate through a graphical interface, yet all such commercially available tools share the common feature of storing code in compiled form. Any current commercial tools that store code typically do not store the code in its entirety.

In addition to the code storage and retrieval mechanisms, the code is ideally stored without reference to the event or procedure that invariably will call it to execute. With the code existing independent of the objects that interact with it, the ability is present to attach, detach or change the code associated with any given event or process. The code exists separate from service or interface that initiates it. Object events (such as clicking a button) are not part of the code, but exist separately to be bound or unbound from the event as desired. This enhances the ability to change or extend code without getting into the code complexities and makes it possible to augment functionality by allowing code segments to be associated with different events without writing code. This loosely-coupled approach is part of the entire architectural structure and creates the link between the code and the user interface or computer process, greatly enhancing the flexibility of the application.

An added benefit associated with the present invention usage of compilation on demand includes self documentation so as to provide a historical context to code changes as well as association with other portions of code. The use of self documentation is appreciated to enhance the readability and speed at which code is modified within the present invention. Self documentation is appreciated to operate as a separate database structure or associated with the code storage itself. Storage of optional code references provides an alias or descriptor accessible through a user interface and provides access to the stored code along with any objects or secondary code as referenced within a given code block. Usage of such a code reference storage enables complete, totally accurate documentation of the code and code structure for the entire application at any given time. As a result, as code is modified, documentation through code reference storage remains current. It is appreciated that partial references, such as objects, or alternatively full references, such as object properties, methods and events, are readily stored within a code reference database or structured file. It is appreciated that code references can be stored like code in a database, structured storage file, library, XML file or the like.

In order to execute code according to the present invention, the stored code is called by way of an optional reference or directly from storage. Called code is compiled at run time for execution or executed directly in the case of code that does not need compilation. SQL code is representative of directly executable code. Preferably, only code necessary for performing a particular process or associated with a particular object of interest is called, retrieved, compiled and executed. As a result, changes to the code are automatically incorporated into the application without recompiling since in a preferred embodiment code that is being used is only compiled at run time. As a result, coding errors are readily traceable through the code storage structure and the full code documentation afforded by optional code reference storage.

An inventive database system differs from existing systems in that only those data entry forms required for a particular transactional table are constructed. It is appreciated that a form is constructed from a default configuration provided with the application or modified by an end user to satisfy a personal preference. In the event that the form is personalized, a mapping protocol is invoked to designate the relationship between inputted data and the database transactional table that the data supports. As a result, an end user need not be trained to use a new system. Rather, the new system is configured to adapt to the existing end user work practices. The present invention captures efficiencies through limiting end user training time and programmer development of a vast array of application functions that the end user does not utilize.

Additionally, the present invention is distinct in establishing database operational rules and scripting those rules to the appropriate server after the database is in place. This is in marked contrast to conventional database protocols that require reconstruction of prewritten rules with incomplete modification of prewritten rules leading to system failures. Additionally, since source and destination fields are wholly editable, the source and destination will be readily constructed to each be a single field or multiple fields thereby allowing an organization to manipulate fields so as to optimize efficiency.

Commercial software packages mentioned herein are indicative of the level of skill in the art to which the invention pertains. These software packages are hereby incorporated by reference to the extent as if each individual package was individually and explicitly incorporated by reference.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A process of performing a software task comprising:
preparing readable programming computer code of an application;
storing said computer code on a computer system in uncompiled form separate from a service or interface initiating an executional call;
changing and automatically incorporating the stored computer code into the application without recompiling the changed computer code;
compiling said changed computer code to machine code at run time in response to said executional call for said computer code and creating an association to said executional call without writing code;
executing said machine code to perform the software task; and
self documenting the compiling step and association to said executional call.

2. The process of claim 1 wherein said computer code is manually written.

3. The process of claim 1 wherein said computer code is automatically generated by a tool.

4. The process of claim 1 wherein said computer code is nested within a larger unit of code.

5. The process of claim 4 wherein said computer code is referenced with an alias.

6. The process of claim 1 wherein said computer code is stored in a database.

7. The process of claim 1 wherein said computer code is stored in a structured storage file.

8. The process of claim 1 wherein said computer code is stored in a library.

9. The process of claim 1 wherein said computer code is stored in an Extensible Markup Language file.

10. The process of claim 1 further comprising storing a reference to said computer code.

11. The process of claim 1 wherein said executional call directly calls said computer code.

12. The process of claim 10 wherein said executional call calls said computer code by way of said reference.

13. The process of claim 10 further comprising generating code documentation from said reference and chronological changes to said reference.

14. The process of claim 10 further comprising querying said computer code for structural information by way of said reference.

15. The process of claim 1 wherein said executional call is a user request, a request by another computer process, a prompt by an interfaced electronic instrument, or a boot event.

16. A process of performing a software task comprising:
preparing readable programming computer code of an application;
storing said computer code on a computer system in uncompiled form separate from a service or interface initiating an executional call;
changing and automatically incorporating the stored computer code into the application without recompiling the changed computer code;
compiling only a partial portion of said changed computer code to machine code at runtime in response to said executional call for said partial portion of said computer code and creating an association to said executional call without writing code;
executing said machine code to perform the software task; and
self documenting the compiling step and association to said executional call.

17. The process of claim 16 wherein said partial portion of said computer code is referenced with an alias.

18. The process of claim 16 further comprising calling said partial portion of said computer code from storage on said computer system in response to said executional call.

19. The process of claim 16 further comprising storing a reference to said partial portion of said computer code.

* * * * *